(12) United States Patent
Haggard

(10) Patent No.: US 8,851,291 B2
(45) Date of Patent: Oct. 7, 2014

(54) DISK HOLDING DEVICE

(71) Applicant: E.Pak International, Inc., Austin, TX (US)

(72) Inventor: Clifton C. Haggard, Austin, TX (US)

(73) Assignee: E.Pak International, Inc., Austin, TX (US)

( * ) Notice: Subject to any disclaimer, the term of this patent is extended or adjusted under 35 U.S.C. 154(b) by 0 days.

(21) Appl. No.: 13/903,128

(22) Filed: May 28, 2013

(65) Prior Publication Data

US 2013/0256164 A1    Oct. 3, 2013

Related U.S. Application Data

(63) Continuation of application No. 13/052,311, filed on Mar. 21, 2011, now abandoned, which is a continuation of application No. 11/868,569, filed on Oct. 8, 2007, now abandoned, which is a continuation-in-part of application No. 11/355,813, filed on Feb. 16, 2006, now abandoned.

(51) Int. Cl.
*B65D 85/30* (2006.01)
*B65D 85/00* (2006.01)

(52) U.S. Cl.
USPC .......................................... 206/710; 220/324

(58) Field of Classification Search
USPC ......... 206/303, 454, 710, 711, 445, 832, 324, 206/326, 308.1; 211/41.18; 220/323, 324; 118/500; 414/936, 940; 294/19, 80, 294/107; 215/237
See application file for complete search history.

(56) References Cited

U.S. PATENT DOCUMENTS

| | | |
|---|---|---|
| 3,939,973 A | 2/1976 | Wallestad |
| 4,061,228 A | 12/1977 | Johnson |
| 4,212,415 A | 7/1980 | Neely |
| 4,721,207 A | 1/1988 | Kikuchi |
| 4,817,799 A | 4/1989 | Gregerson et al. |
| 4,880,116 A | 11/1989 | Kos |
| 4,964,661 A | 10/1990 | Cadwell et al. |
| 5,100,015 A | 3/1992 | Vanderstuyf |
| 5,253,755 A | 10/1993 | Naenke |

(Continued)

FOREIGN PATENT DOCUMENTS

| | | |
|---|---|---|
| EP | 0266902 | 5/1988 |
| JP | 09002563 | 1/1997 |
| JP | 2004083014 | 3/2004 |
| WO | 9104926 | 4/1991 |

OTHER PUBLICATIONS

Singapore Search Report mailed May 22, 2008 for Application No. 200701014-3.

(Continued)

*Primary Examiner* — Andrew Perreault
(74) *Attorney, Agent, or Firm* — Carlson, Gaskey & Olds

(57) ABSTRACT

A disk holding device according to an exemplary aspect of the present disclosure includes, among other things, a cassette that includes an interior and an end wall and a cover that is received against the cassette to at least partially cover the interior, the cover having a latch arm that includes a channel established by a first edge wall and a second edge wall, the channel receiving a complementary portion formed in the end wall of the cassette. The first edge wall is received against an interior surface of the end wall that faces toward the interior and the second edge wall is received against an exterior surface of the end wall that faces away from the interior.

17 Claims, 7 Drawing Sheets

(56) References Cited

U.S. PATENT DOCUMENTS

| | | |
|---|---|---|
| 5,390,811 A | 2/1995 | Ogino et al. |
| 5,531,345 A | 7/1996 | Nakamura |
| 5,551,589 A | 9/1996 | Nakamura |
| 5,575,394 A | 11/1996 | Nyseth |
| 5,577,779 A | 11/1996 | Danget |
| 5,704,494 A | 1/1998 | Nishikiori et al. |
| 5,833,067 A | 11/1998 | Joshi |
| 5,850,921 A | 12/1998 | Shindou et al. |
| 5,931,514 A | 8/1999 | Chung |
| 6,070,730 A | 6/2000 | Narisaswa et al. |
| 6,131,760 A | 10/2000 | Huang |
| 6,398,594 B1 | 6/2002 | Bonilla et al. |
| 6,902,059 B2 | 6/2005 | Whalen et al. |
| 7,175,026 B2 | 2/2007 | Hachtmann |
| 7,413,479 B1 | 8/2008 | Volpone |
| 2003/0029772 A1 | 2/2003 | Whalen et al. |
| 2003/0205501 A1 | 11/2003 | Hachtmann |
| 2004/0137781 A1 | 7/2004 | Ye et al. |
| 2005/0145410 A1 | 7/2005 | Daito |
| 2006/0108242 A1 | 5/2006 | Christensen et al. |
| 2006/0213152 A1 | 9/2006 | Mosher |
| 2007/0187288 A1 | 8/2007 | Haggard et al. |
| 2009/0084696 A1 | 4/2009 | Ruden et al. |

OTHER PUBLICATIONS

Written Opinion from the Intellectual Property Office of Singapore for Singapore Patent Application No. 201106750-1 dated Aug. 7, 2013.

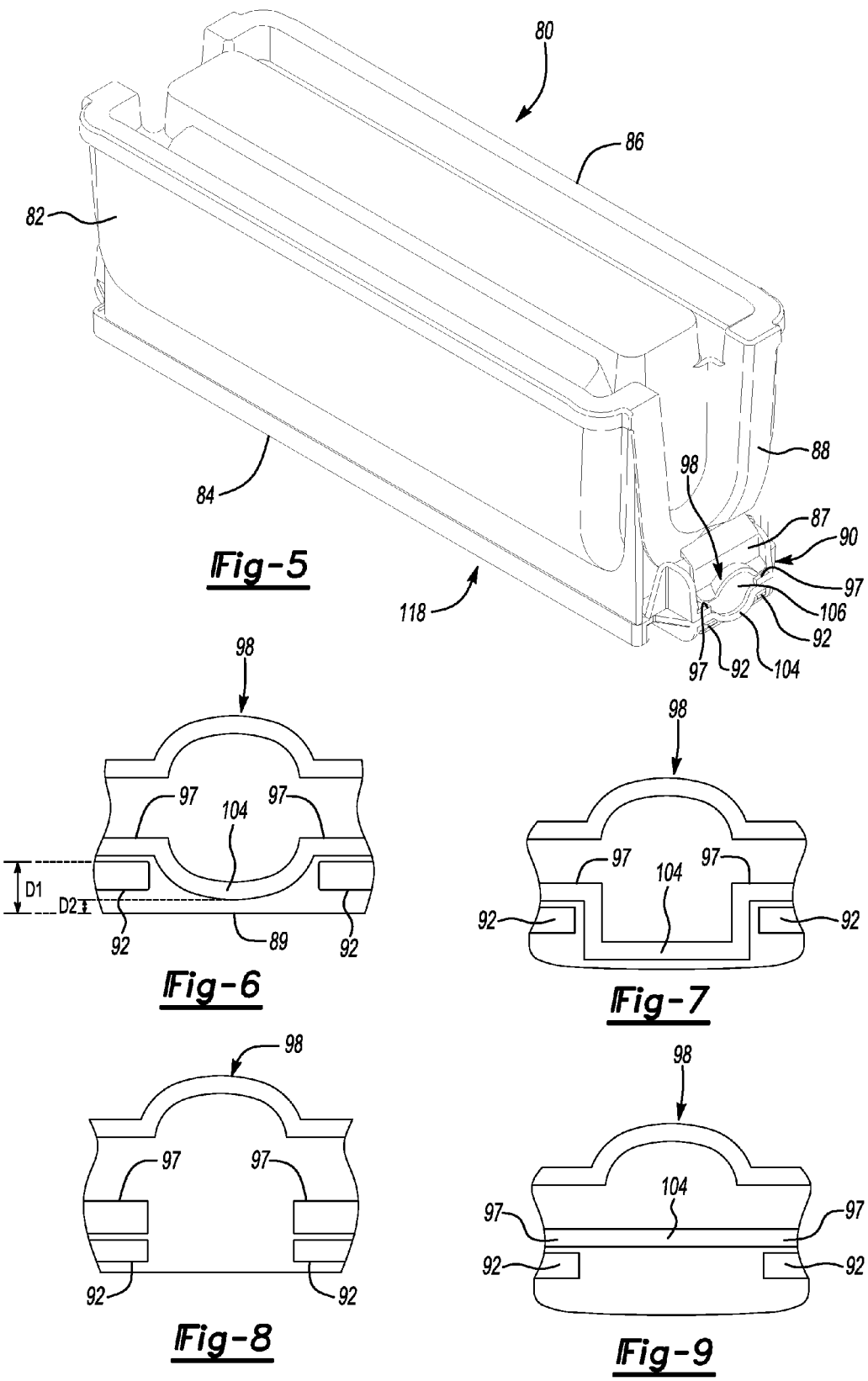

DISK HOLDING DEVICE

CROSS REFERENCE TO RELATED APPLICATIONS

This application is a continuation of U.S. patent application Ser. No. 13/052,311, filed Mar. 21, 2011, which is a continuation-in-part of U.S. patent application Ser. No. 11/868,569, filed Oct. 8, 2007, which is a continuation-in-part of U.S. patent application Ser. No. 11/355,813, filed Feb. 16, 2006.

BACKGROUND

This disclosure generally relates to a disk holding device, and more particularly to a locking mechanism for a disk holding device.

Hard drive disks typically are manufactured in one location and packaged in disk holding devices, which are subsequently placed in a container for shipment to another location. The disk holding devices eventually are removed from the containers and used to store the hard drive disks during distribution in a production process. The hard drive disks must be protected during all phases of a normal production cycle.

A variety of disk holding devices have been developed for packaging, shipping and distributing disks. Typical disk holding devices include a cassette portion, a cover and a latch to lock the device closed. As is known, hard drive disks are received within a plurality of slots within the cassette portion interior. One example is shown in U.S. Pat. No. 6,902,059. Other disk holding devices are also known.

During the production process, it is often necessary to remove the cover from the cassette portion of the disk holding device to access the hard drive disks stored within. Automated machinery is often utilized to unlock and remove the cover of the disk holding device. To achieve this result, and because of the locking design of the latch arm of known disk holding devices, the automated machinery must manipulate the latch arm by applying an outward pulling force on the latch arm in a direction away from the interior of the disk holding device to unlock and remove the cover. The manipulation applied by the automated machinery may fail to unlock the latch arm in a relatively large number of instances. Disadvantageously, this may result in decreased production efficiency and increased manufacturing complaints concerning the disk holding devices.

As such, there is a need for an improved arrangement for locking a disk holding device that achieves improved interaction with automated machinery used in the distribution process. This disclosure provides an improved latch arm that satisfies that need.

SUMMARY

A disk holding device according to an exemplary aspect of the present disclosure includes, among other things, a cassette that includes an interior and an end wall and a cover that is received against the cassette to at least partially cover the interior. The cover includes a latch arm having a channel established by a first edge wall and a second edge wall. The channel receives a complementary portion formed in the end wall of the cassette. The first edge wall is received against an interior surface of the end wall that faces toward the interior and the second edge wall is received against an exterior surface of the end wall that faces away from the interior.

In a further non-limiting embodiment of the foregoing device, the channel and the complimentary portion establish a tortuous path between the interior of the cassette and a surrounding environment.

In a further non-limiting embodiment of either of the foregoing devices, the first edge wall abuts the interior surface and the second edge wall abuts the exterior surface as the cover is moved into engagement with the cassette.

In a further non-limiting embodiment of any of the foregoing devices, the first edge wall and the second edge wall overlap the complementary portion.

In a further non-limiting embodiment of any of the foregoing devices, the first edge wall and the second edge wall establish sides of the channel.

In a further non-limiting embodiment of any of the foregoing devices, the channel extends along an edge of the latch arm.

In a further non-limiting embodiment of any of the foregoing devices, the complementary portion is received at least partially into the channel as the cassette and the cover are brought together.

In a further non-limiting embodiment of any of the foregoing devices, a tortuous path extends along a path from the first edge wall, around the interior surface, between the complementary portion and the channel, across the exterior surface, and then around the second edge wall.

In a further non-limiting embodiment of any of the foregoing devices, the first edge wall and the second edge wall extend outwardly past a periphery established by the complementary portion as the cassette and the cover are brought together.

In a further non-limiting embodiment of any of the foregoing devices, the first edge wall and the second edge wall extend past outermost edges of the complementary portion in a direction toward side walls of the cassette.

In a further non-limiting embodiment of any of the foregoing devices, a base is received on an opposite side of the cassette from the cover.

In a further non-limiting embodiment of any of the foregoing devices, the latch arm extends to the base.

In a further non-limiting embodiment of any of the foregoing devices, the latch arm latches to the base.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 5 illustrates an assembled view of the second example disk holding device illustrated in FIG. 4.

FIG. 6 illustrates a front view of an example locking surface configuration of the disk holding device shown in FIG. 4.

FIG. 7 illustrates a front view of another example locking surface configuration of the disk holding device shown in FIG. 4.

FIG. 8 illustrates a front view of yet another example locking surface configuration of the disk holding device shown in FIG. 4.

FIG. 9 illustrates a front view of yet another example locking surface configuration of the disk holding device shown in FIG. 4.

DETAILED DESCRIPTION OF A PREFERRED EMBODIMENT

Figure 1:
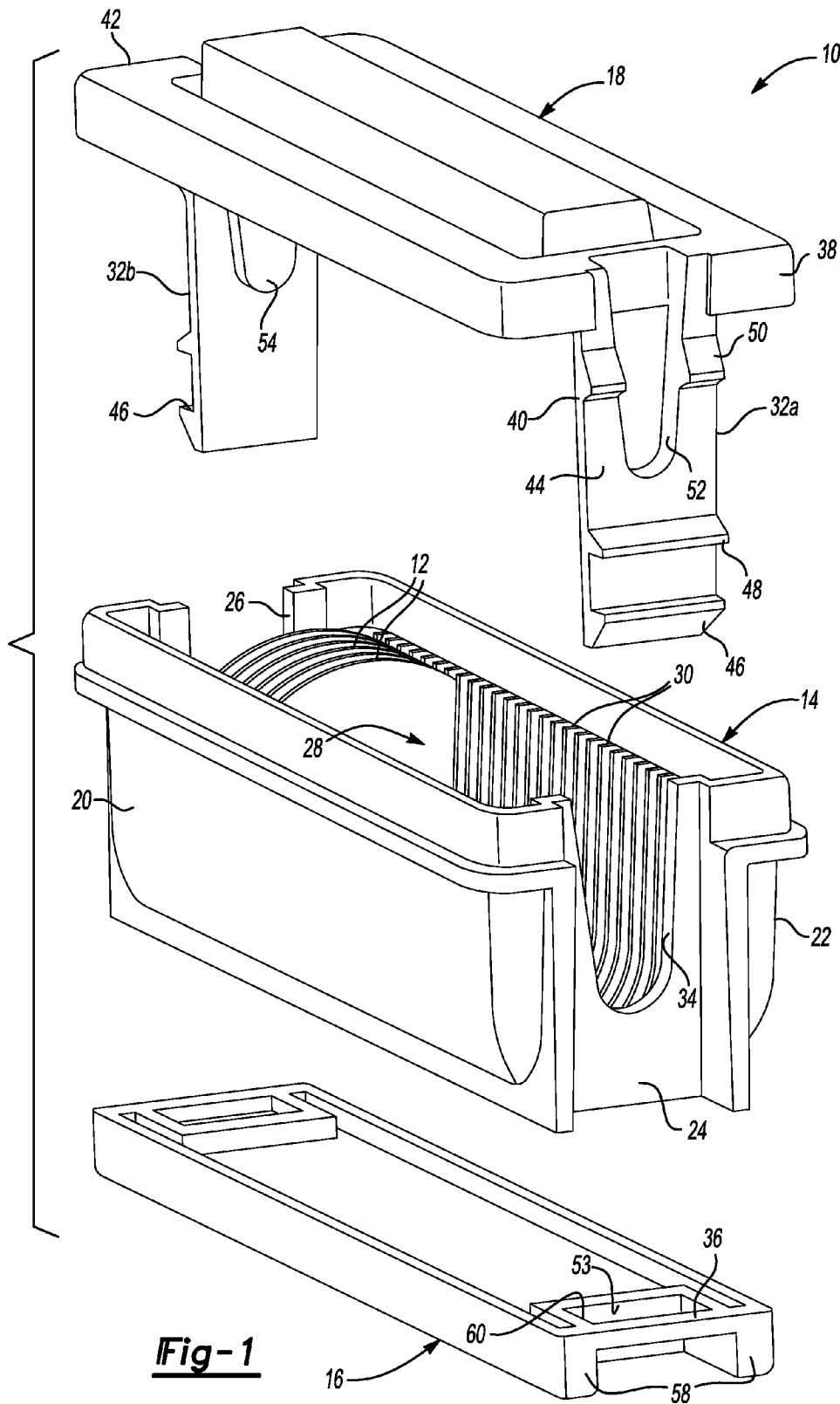
FIG. 1 schematically shows a disk holding device including a latch arm designed according to one embodiment of this disclosure.

FIG. 1 schematically shows an example disk holding device 10 for housing a plurality of disks 12. The example disk holding device 10 includes a cassette portion 14, an example base portion 16 and an example cover 18. The cassette portion 14 includes two side walls 20, 22 and two end walls 24, 26 which are configured to form an interior 28 for safely packaging the plurality of disks 12. The side walls 20, 22 are aligned generally parallel to one another and are designed to minimize contact between and provide support to the plurality of disks 12, keeping them spaced apart from one another and in a generally stable position within the disk holding device 10. The disks 12 are received in a plurality of slots 30 formed in the side walls 20, 22 of the cassette portion 14.

At least one of the opposing end walls 24, 26 includes a channel 34. In one example, both end walls 24, 26 include a channel 34. In the illustrated example, the channel 34 is generally U-shaped. The channel 34 is provided on at least one end wall 24, 26 for access to the hard drive disks 12 when packaged in the cassette portion 14.

In the illustrated example, the base portion 16 is secured on one side of the cassette portion 14 using an interference fit, for example. In another example, the base portion 16 is formed as a single piece, integral with the cassette portion 14. The cover 18 is received against an opposite side of the cassette portion 14 from the base portion 16. The cover 18 includes a latch arm 32 for locking the disk holding device 10 that extends toward the base portion 16 and is selectively secured to a locking surface 36 of the base portion 16. In one example, the cover 18 includes two latch arms 32, with one latch arm 32 positioned at each end of the cover 18.

Figure 2:
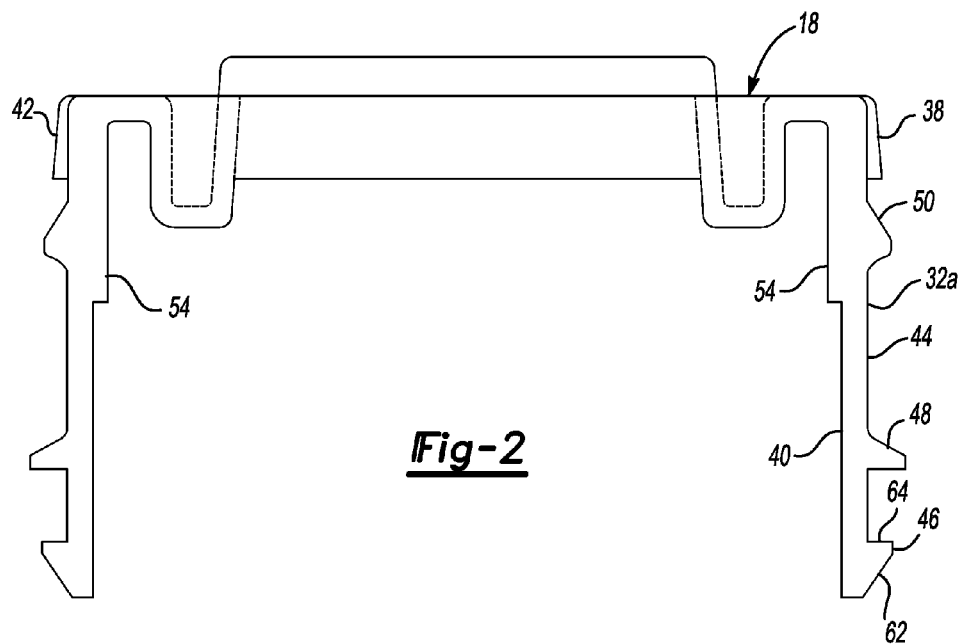
FIG. 2 is a side view of the cover for the disk holding device of FIG. 1.

FIGS. 1 and 2 illustrate the latch arm 32A positioned near one end 38 of the cover 18. The latch arm 32A extends transversely from the cover 18 (i.e., toward the base portion 16). A first surface 40 of the latch arm 32A faces generally toward an end 42 of the cover 18 which is opposite the end 38. The latch arm 32A includes a second surface 44 which faces opposite the first surface 40. In other words, the second surface 44 faces away from the end 42 of the cover 18.

The example latch arm 32 includes a locking tab 46 that protrudes from the second surface 44 away from the cover 18. In one example, the locking tab 46 is positioned at a distal end of the latch arm 32. The latch arm also includes a lifting ledge 48 and at least one finger grip 50. The lifting ledge 48 may assist automated removal of the cover 18 as described below. In the disclosed example, two finger grips 50 are included on the latch arm 32. The finger grips 50 may assist a user in manually manipulating the cover 18 relative to the disk holding device 10.

In one example, the lifting ledge 48 and at least one finger grip 50 extend in substantially the same direction as the locking tab 46. The example lifting ledge 48 is positioned on the second surface 44 of the latch arm 32 between the finger grip 50 and the locking tab 46. Each of the locking tab 46, the lifting ledge 48 and the finger grip 50 protrude in a transverse direction away from the second surface 44 of the latch arm 32. The transverse direction faces away from the interior 28 of the disk holding device 10, for example. Having a latch arm 32 with features such as the locking tab 46 that face away from the interior 28 of the disk holding device 10 is the opposite of previous designs. The example embodiment facilitates improved interaction between the disk holding device 10 and automated machinery used to manipulate the latch arm 32 during a production process.

An exemplary base portion 16 includes a locking surface 36 near one end wall 53. In one example, the end wall 53 includes arm portions 58 adjacent the locking surface 36 to provide support and rigidity. The locking surface 36 extends between the two arm portions 58. A groove 60 exists between the end wall 53 and the locking surface 36. At least a portion of the latch arm 32 is received through the groove 60 when the cover 18, the cassette portion 14 and the base 16 are assembled as shown in FIG. 3, for example.

A groove 52 is formed on the latch arm 32 between the two finger grips 50. The groove 52 on the surface 44 exists, in part, to establish a boss 54 that extends from the first surface 40 of the latch arm toward the interior of the device 10. The boss 54 selectively engages the channel 34 of an end wall 24, 26 to seal the disk holding device 10 when the cover 18 is received and locked on the cassette portion 14 (see FIG. 3, for example).

Figure 3:
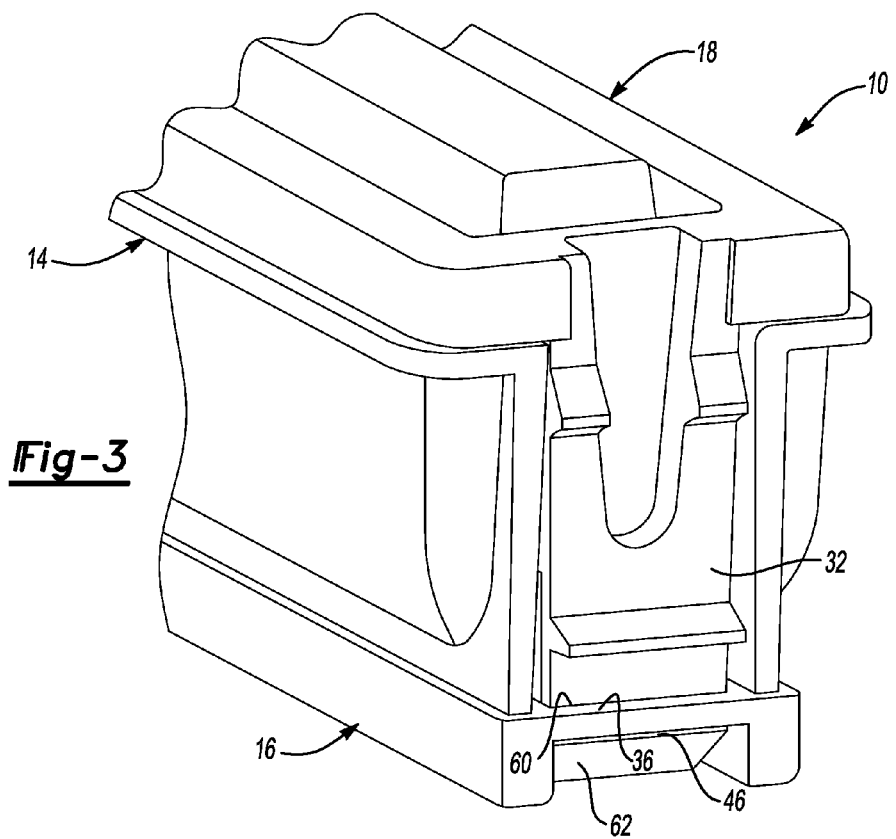
FIG. 3 illustrates the disk holding device of FIG. 1 in an assembled condition.

An assembled disk holding device 10 is illustrated in FIG. 3. In this example, the cover 18 is secured to the disk holding device 10 in a locked position. The latch arm 32 at least partially extends through the groove 60 of the base portion 16. The locking tab 46 at least partially abuts the locking surface 36. The locking tab 46 is received against the locking surface 36 of the base portion 16 as the portion of the latch arm 32 moves through the groove 60. As best appreciated from FIG. 2, the locking tab 46 has an angled surface 62 that facilitates inserting the tab through the groove 60. The locking tab 46 also has a locking surface 64 that contacts the locking surface 36 on the base portion 16.

FIGS. 4-8 schematically illustrate another example disk holding device 80 for housing a plurality of disks 12. The disk holding device 80 includes a cassette portion 82, a base portion 84 and a cover 86. The cassette portion 82 is substantially similar to the cassette portion 14 of the example disk holding device 10. However, the base portion 84 and the cover 86 include unique features different from the example base portion 16 and the example cover 18 of the disk holding device 10.

In this example, the cover 86 includes an end wall 88 having a latch arm 87 for locking the disk holding device 80 that extends toward the base portion 84 and is selectively secured to a locking surface 90 of the base portion 84. In one example, the cover 86 includes two end walls 88, with one latch arm 87 positioned at each end of the cover 86.

Figure 4:
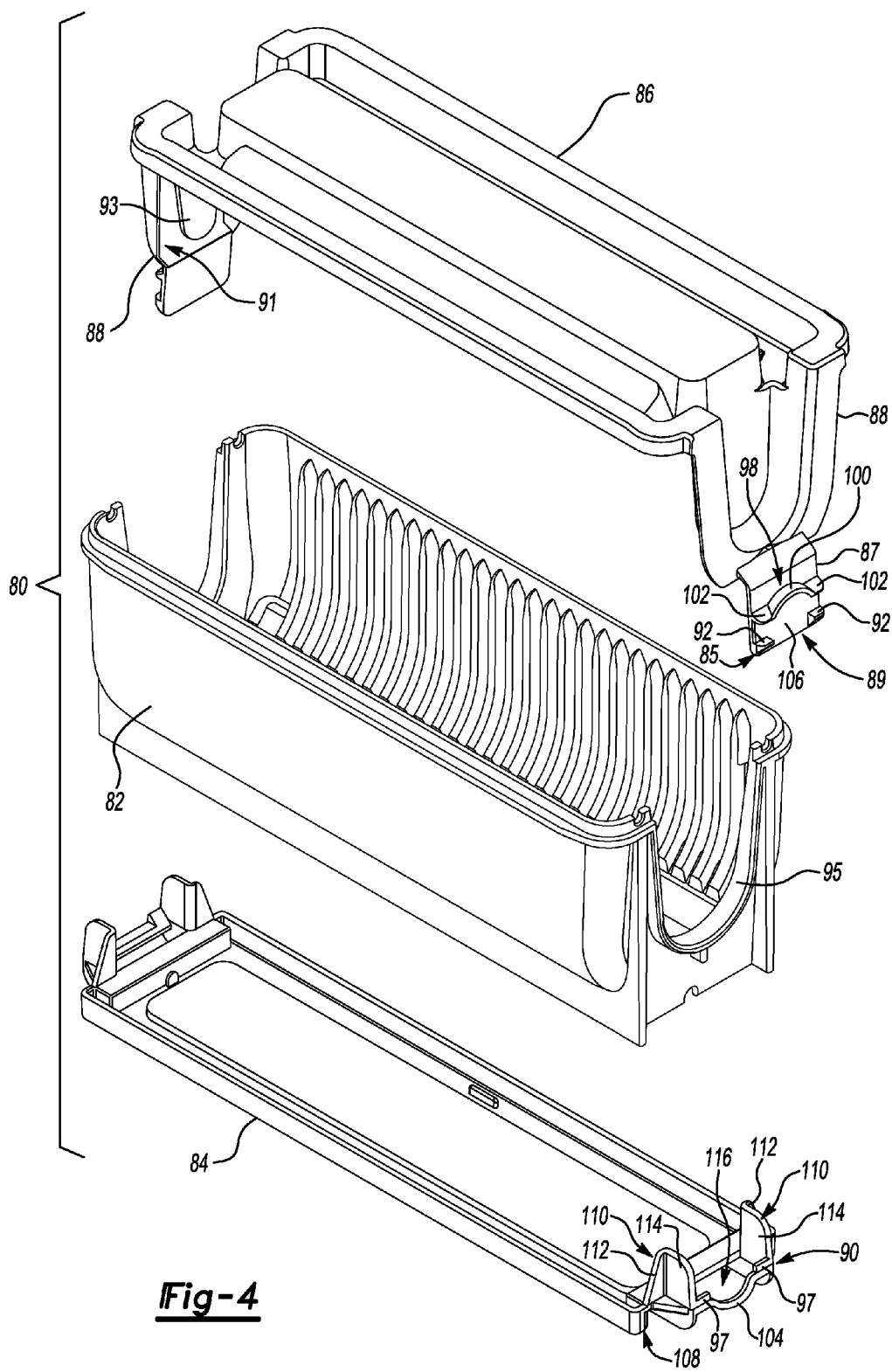
FIG. 4 illustrates a second example disk holding device.

FIGS. 4 and 5 illustrate the end walls 88 extending transversely from the cover 86 and toward the base portion 84. The example end walls 88 include a channel engaging portion 91 and a locking tab 85 that protrudes from the latch arm 87 in a direction away from the cover 86 (i.e., away from the interior of the disk holding device 80). The locking tab 85 is positioned adjacent to a distal end 89 of the latch arm 87, in one example. The channel engaging portion 91 exists, in part, to establish a boss 93 that extends from the latch arm 87 toward the interior of the disk holding device 80. The boss 93 selectively engages a channel 95 of the end walls 88 of the cassette portion 82 when the cover 86 is received and locked on the cassette portion 82 (see FIG. 5, for example).

In one example, the locking tab 85 of the latch arm 87 includes two engaging surfaces 92 that are spaced apart and positioned at opposite edges of the latch arm 87 adjacent to the distal end 89. It should be understood that the actual number and positioning of the engaging surfaces 92 of disk holding device 80 will vary depending upon design specific parameters including the design of the locking surface 90 of the base portion 84. For example, the latch arm 87 may include only one engaging surface 92 similar to the configuration shown in FIG. 1.

The latch arm 87 also includes a lifting ledge 98. The lifting ledge 98 is offset from the engaging surfaces 92 of the latch arm 87 in a direction towards the end of the disk holding device 80 which includes the cover 86, in this example. The lifting ledge 98 may assist automated or manual removal of the cover 86, as described in greater detail below.

In one example, the lifting ledge 98 protrudes from the latch arm 87 the same direction as the engaging surfaces 92 (i.e., transversely from the exterior surface of the latch arm 87). The lifting ledge 98 includes a curved portion 100 which is positioned between two ledge portions 102, in one example. The curved portion 100 minors a corresponding central portion 104 of the locking surface 90, for example, as is further discussed below.

A manipulating surface 106 is exposed between the engaging surfaces 92 and the lifting ledge 98 of the latch arm 87 when the cover 86 is locked in place. Having a latch arm 87 with features such as the engaging surfaces 92 that face away from the interior of the disk holding 80 is the opposite of previous designs. The example embodiment facilitates an improved interaction between the disk holding device 80 and a human finger or automated machinery used to manipulate the latch arms 87 during a production process.

The example base portion 84 includes a locking surface 90 near one end wall 108. In one example, the base portion 84 includes arms 110 adjacent to the locking surface 90 to provide support and rigidity. The locking surface 90 extends between the arms 110. Each arm 110 includes a first portion 112 which extends toward the cover 86 and a second portion 114 which protrudes away from the interior of the disk holding device 80 in a direction similar to the engaging surfaces 92 to at least partially sandwich the latch arms 87. A groove 116 exists between the end wall 108 and the locking surface 90 and extends between the second surfaces 114 of the arms 110. At least a portion of the latch arm 87 is received through the groove 116 when the disk holding device 80 is assembled in a locked position (see FIG. 5). The second portions 114 of the arms 110 partially sandwich the latch arms 87 and prevent any inadvertent unlatching of the latch arms 87 during shipping, etc.

In one example, a central portion 104 of the locking surface 90 extends horizontally (i.e., straight across) between the arms 110 (See FIG. 9). In another example, the locking surface 90 includes an "interrupted" central portion 104 disposed between flanges 97. "Interrupted" is intended to describe a locking surface that is not straight across the entire surface but, instead, varies in configuration or profile at the central portion 104. In one example, the central portion 104 is curved and minors the curved portion 100 of the lifting ledge 98 (See FIG. 6). However, a person of ordinary skill in the art would understand that the central portion 104 could comprise other shapes and configurations. For example, the central portion 104 may be generally rectangular (See FIG. 7). In yet another example, the flanges 97 of the locking surface 90 exclude the central portion 104 (i.e., the flanges 97 are not bridged by the central portion 104) (See FIG. 8).

The curved central portion 104 (FIG. 6) extends in a direction toward a bottom end of the disk holding device 80. In one example, the manipulating surface 106 mimics the shape of a human finger. The example central portion 104 leaves the manipulating surface 106 exposed, which allows the contact point of the manipulating surface 106 to be moved more toward the bottom end 118 of the disk holding device 80. This provides improved leverage such that a reduced force is required to manipulate the latch arm 87 to open the disk holding device 80.

The engaging surfaces 92 of the locking tab 85 abut the flanges 97 of the locking surface 90 to attach the cover 86 to the base portion 84 when the disk holding device 80 is assembled as shown in FIG. 6, for example. The manipulating surface 106 is unobstructed by the central portion 104 of the locking surface 90 in the area adjacent to the engaging surfaces 92.

The engaging surfaces 92 in this example are offset from a distal end 89 of the latch arm 87 a first distance D1 as shown in FIG. 6. The central portion 104 of the locking surface 90 is offset from the distal end 89 of the latch arm 87 a second distance D2. The first distance D1 is greater than the second distance D2, in one example (See FIG. 6). This arrangement includes the feature exposing the manipulating surface 106 toward the bottom end 118 of the disk holding device 80.

Figure 10A:
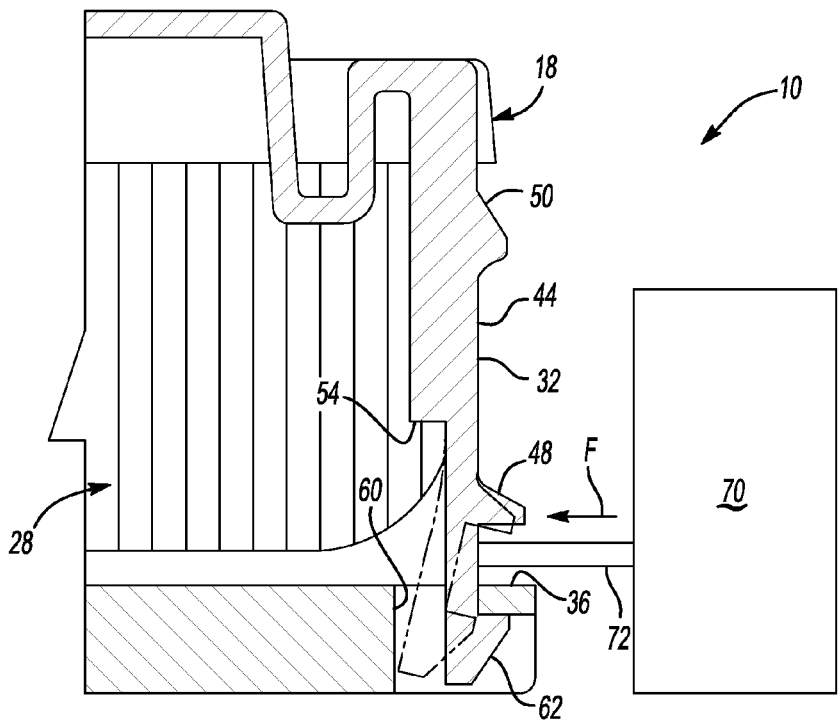
FIGS. 10A and 10B schematically show a process for unlocking the example disk holding devices.
Figure 10B:
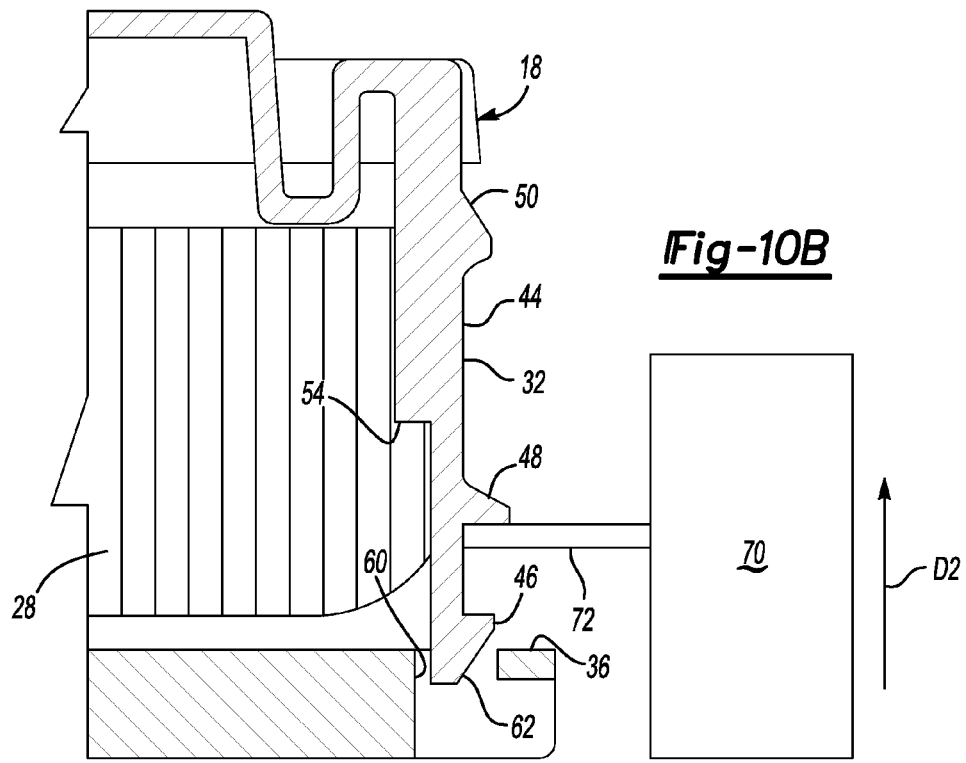

FIG. 10A schematically shows a machine 70 that manipulates the latch arm 32 of the cover 18 by applying a force F on the latch arm 32 in a direction toward the interior 28 of the disk holding device 10. Although the present example is illustrated in terms of the disk holding device 10, a similar process would also apply for manipulating the latch arm 87 of the second example disk holding device 80. In the illustrated example, the force F is applied to the surface 44 below the lifting ledge 48 (Or, the manipulating surface 106 of the second example disk holding device 80). The example machine 70 has an arm 72 that contacts the surface 44 to apply the force F. The arm 72 moves the distance sufficient to push the locking surface 64 clear of the locking surface 36 so that the locking tab 46 is aligned with the groove 60. The resiliency of the latch arm 32 biases the locking tab 46 away from the interior 28 of the cassette portion 14 such that the locking surfaces 36 and 64 cooperate to keep the device 10 closed. The force F is sufficient to overcome that bias. While maintaining the force F on the latch arm 32, the arm 72 moves in an opening direction D2 to remove the cover 18 from the disk holding device 10, as is illustrated in FIG. 10B. In the illustrated example, the second direction D2 is transverse to the direction of the force F. The lifting ledge 48 (or the lifting ledge 98 of the disk holding device 80) may assist arm 72 in lifting the cover 18 off of the base portion 16 and the cassette 14.

In another example, the latch arm 32 and the cover 18 are manually manipulated to remove a cover 18. For example, an individual may press against the surface 44 and use the finger grip 50 to manipulate the cover as desired. In yet another example, an individual may press against the manipulating surface 106 to release the latch arm 87 of the example disk holding device 80.

The illustrated examples include various features that provide improved interaction between production machinery or a human hand and a disk holding device to achieve a more simple method of unlocking a latch arm, for example. The illustrated examples include combinations of improved latch arms and base portion features. For example, the position of the latch arm 32 within the groove 60 of the example disk holding device 10 provides more security compared to previous arrangements where a latch arm engaged a base from the outside edge of the base. In another example, the improved design of the latch arm 87 and the locking surface 90 of the example disk holding device 80 results in a lower contact point on the latch arm and provides improved leverage such that less force is needed to release the latch arm 87. Those skilled in the art having the benefit of this description will be able to utilize a latch arm having a locking tab, a base portion with a locking surface, a lifting ledge or finger grips or any combination of these features to meet the needs of their particular situation.

Figure 11:
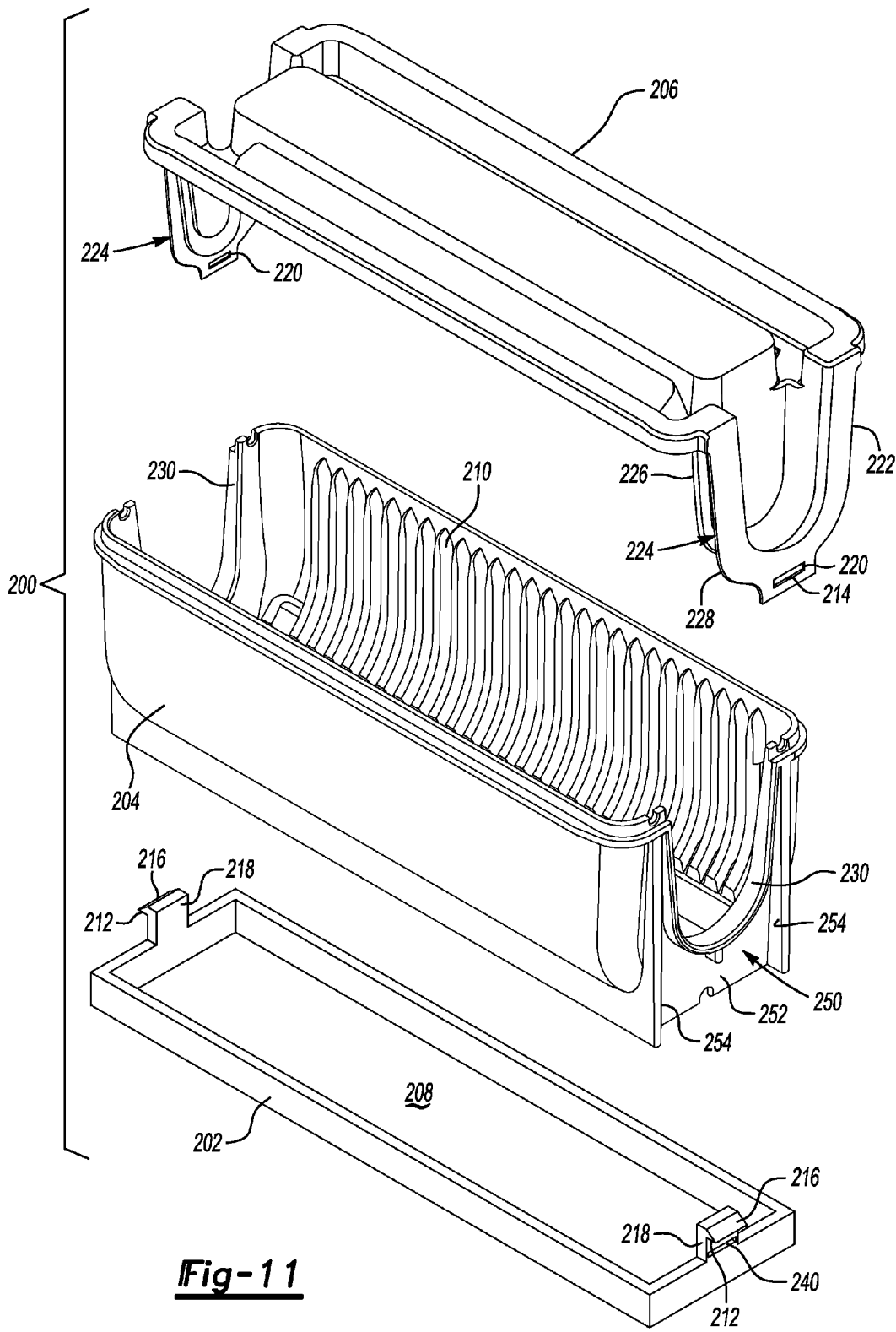
FIG. 11 illustrates another example disk holding device designed according to an embodiment of this disclosure.

FIG. 11 shows another example disk holding device 200. This example includes a base 202, a cassette 204 and a cover 206. A portion of the cassette 204 along one side (the lower side according to the drawing) is received in an interior 208 of the base 202. The cover 206 is received over an opposite side (the upper side according to the drawing) of the cassette 204. When the cover 206 is secured to the base 202 with the cassette 204 between them, an interior of the device is sealed off to prevent any contamination of disks or wafers held in slots 210 within an interior of the cassette 204.

This example includes cooperating locking surfaces for securing the cover 206 to the base 202. The base 202 includes a first locking surface 212 that engages a second locking surface 214 on the cover 206. The illustrated base 202 includes a tab 216 on a stem 218. The first locking surface 212 is on the tab 216. The second locking surface 214 is a surface along one edge of a slot 220 on a latch arm 222 of the cover 206. When the three components of the device 200 are properly aligned and received against each other, the tab 216 is at least partially received into the slot 220 so that the first locking surface 212 is received against the second locking surface 214. When the locking surfaces are against each other in that position, the cover 206 cannot be separated from the base 202 and the cassette 204 remains securely between them.

Figure 12:
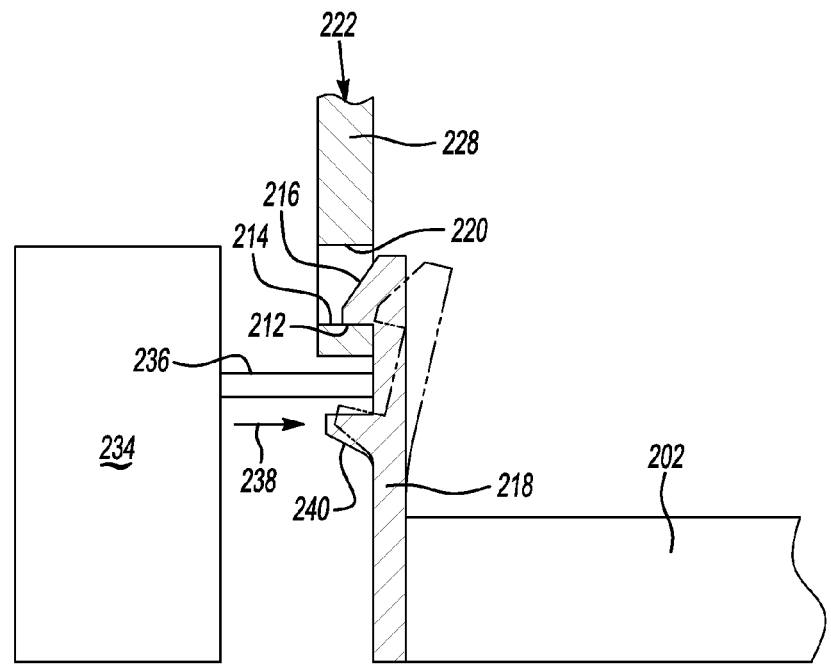
FIG. 12 schematically shows a process for unlocking the example disk holding device of FIG. 11.

Referring to FIG. 12, the first locking surface 212 is shown in a locking position engaging the second locking surface 214. A machine 234 includes a mover 236 that applies a force to the stem 218 as schematically shown by the arrow 238. The mover 236 urges the tab 216 and a portion of the stem 218 toward the interior of the cassette 204. The stem 218 in this example is at least partially flexible and resilient so that absent a force applied by the machine 234 or a manual force applied by an individual, the stem 218 remains in the position shown in solid lines in FIG. 12, which is the same orientation of the stem 218 in FIG. 11.

As shown in phantom in FIG. 12, as the mover 236 causes sufficient movement of the tab 216, the first locking surface 212 moves clear of the second locking surface 214 to unlock the device, which allows the cover 206 to be separated from the base 202 for exposing the interior of the cassette 204 to provide access to any disks or wafers contained in the cassette 204. The illustrated example includes a holding surface 240 on the stem 218 to facilitate separation of the cover 206 and the base 202. In this example, the holding surface 240 is a raised surface. Other holding surface configurations are included in other examples. The holding surface 240 interrupts a face of the stem 218 to provide the ability to resist or cause movement of the base 202 when it is being separated from the cover 206.

The mover 236 in this example contacts a face on the stem 218 between the first locking surface 212 and the holding surface 240 as can be appreciated from the drawing. As the cover 206 is moved away from the base 202 (e.g., the cover is moved upward or the base is moved downward) the mover 236 can contact the surface 240 to either prevent the base 202 from moving in the same direction that the cover 206 is moving as they are being separated or to facilitate moving the base 202 away from the cover (e.g., if the mover 236 moves downward according to the drawing).

One feature of the example of FIGS. 11 and 12 is that the movement of the tab 216 occurs in an inward direction toward an interior of the cassette 206 for unlocking the device. During that movement the tab 216 and some of the stem 218 are received into a recess 250 between an end wall 252 and side supports 254 on the cassette 206. This takes advantage of space that is available within the outer envelope of the device 200 and does not require any clearance outside of that envelope for manipulating any portions of the device 200 during unlocking and handling procedures.

Another feature of the example of FIGS. 11 and 12 is that the cover 206 has a channel 224 along an edge of the latch arm 222. Edge walls 226 and 228 establish sides of the channel 224. The edge walls 226 and 228 overlap a complementary portion 230 of the cassette 204 when the container 200 is closed. The complementary portion 230 of the cassette 204 is received at least partially into the channel 224 when the cassette 204 and the cover 206 are brought together. This arrangement provides a tortuous path between the interior of the cassette 204 and the surrounding environment that is operative to prevent outside contaminants from entering the container and contacting a surface on the disks inside the container. This feature adds further security to the integrity of the disks or wafers within this example container.

Figure 13:
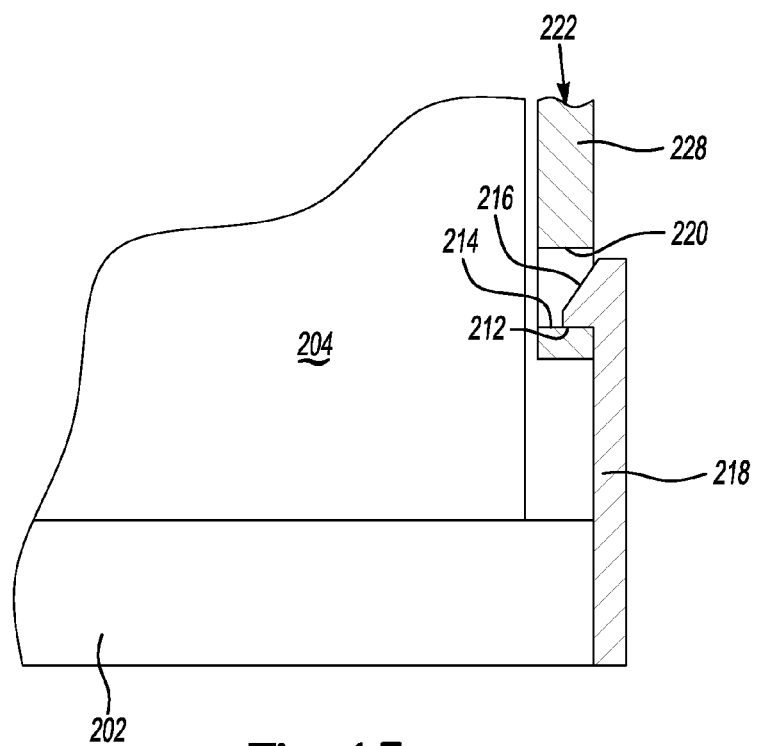
FIG. 13 schematically shows selected portions of another example embodiment.

FIG. 13 shows another example arrangement in which the tab 216 protrudes in an inward direction toward the interior of the cassette 204. The first locking surface 212 is on the tab 216. The second locking surface 214 is on one side of the slot 220. In this example, the latch arm 222 is received inside of the stem 218 when the cover 206 is secured to the base 202, which is different than the example of FIGS. 11 and 12 in which the latch arm 22 is received outside of the stem 218. In this example, the latch arm 222 is moveable inwardly to release the first and second locking surfaces and unlock the cover 206 from the base 202.

The foregoing description shall be interpreted as illustrative and not in any limiting sense. A worker of ordinary skill in the art would recognize that certain modifications would come within the scope of this disclosure. For that reason, the following claims should be studied to determine the true scope and content of this disclosure.

I claim:

1. A disk holding device, comprising:
   a cassette that includes an interior and an end wall;
   a cover that is received against said cassette to at least partially cover said interior, said cover having a latch arm that includes a channel established by a first edge wall and a second edge wall, said channel receiving a complementary portion formed in said end wall of said cassette; and
   wherein said first edge wall is received against a portion of an interior surface of said end wall and said second edge wall is received against a portion of an exterior surface of said end wall, said portion of said interior surface facing toward said interior and said portion of said exterior surface facing away from said interior; further comprising a base received on an opposite side of said cassette from said cover, wherein said latch arm latches to said base.

2. The device of claim 1, wherein said channel and said complementary portion establish a tortuous path between said interior of said cassette and a surrounding environment.

3. The device of claim 1, wherein said first edge wall abuts said interior surface and said second edge wall abuts said exterior surface as said cover is moved into engagement with said cassette.

4. The device of claim 1, wherein said first edge wall and said second edge wall overlap said complementary portion.

5. The device of claim 1, wherein said first edge wall and said second edge wall establish sides of said channel.

6. The device of claim 1, wherein said channel extends along an edge of said latch arm.

7. The device of claim 1, wherein said complementary portion is received at least partially into said channel as said cassette and said cover are brought together.

8. The device of claim 7, comprising a tortuous path that extends along a path from said first edge wall, around said interior surface, between said complementary portion and said channel, across said exterior surface, and then around said second edge wall.

9. The device of claim 1, wherein said first edge wall and said second edge wall extend outwardly past a periphery established by said complementary portion as said cassette and said cover are brought together.

10. The device of claim 1, wherein said first edge wall and said second edge wall extend past outermost edges of said complementary portion in a direction toward side walls of said cassette.

11. The device of claim 1, wherein said complementary portion is a peripheral surface of an opening in said end wall.

12. The device of claim 11, wherein said opening is U-shaped.

13. The device of claim 1, wherein said first edge wall is parallel to said second edge wall.

14. The device of claim 1, wherein said first edge wall and said second edge wall extend in parallel with said end wall.

15. The device of claim 1, wherein said latch arm includes a first locking surface that engages a second locking surface of said base that is separate from said cassette.

16. The device of claim 15, wherein one of said first locking surface and said second locking surface is a slot and the other of said first locking surface and said second locking surface is a surface of a tab of a stem.

17. A disk holding device, comprising:
a cassette that includes an interior and an end wall;
a cover that is received against said cassette to at least partially cover said interior, said cover having a latch arm that includes a channel established by a first edge wall and a second edge wall, said first edge wall and said second edge wall overlapping a complementary portion formed in said end wall of said cassette such that said first edge wall is received against an interior surface of said end wall and said second edge wall is received against an exterior surface of said end wall; and
a base received on an opposite side of said cassette from said cover, wherein said latch arm is securable to said base.

\* \* \* \* \*